April 1, 1947.                J. R. GREENLEE                2,418,404
                                KELLY COCK
                            Filed Feb. 8, 1944
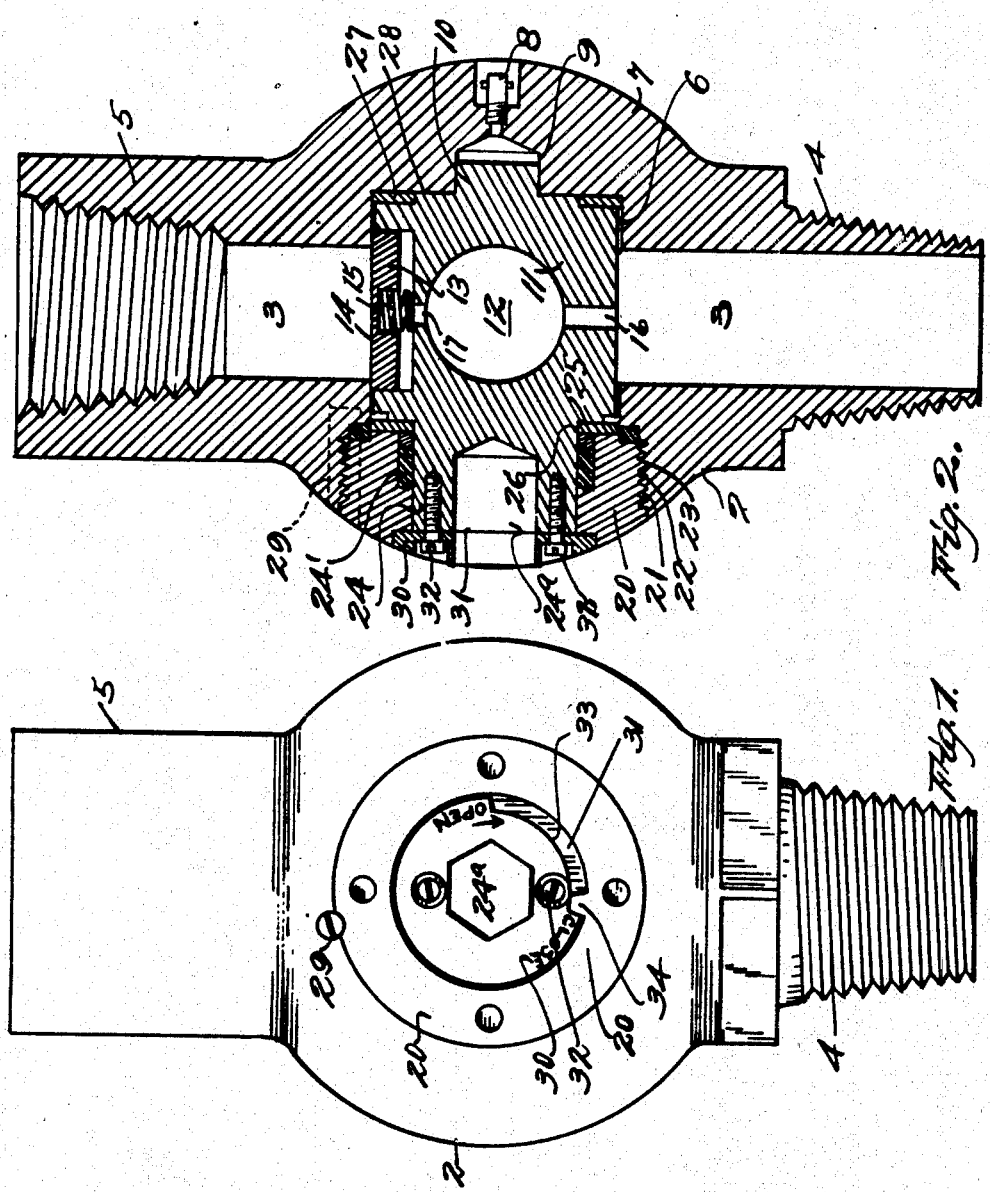
Joseph R. Greenlee,
    Inventor;
By his Attorney,
Frederick E. Maynard.

Patented Apr. 1, 1947

2,418,404

UNITED STATES PATENT OFFICE 2,418,404

KELLY COCK

Joseph R. Greenlee, Santa Fe Springs, Calif., assignor to Shaffer Tool Works, a corporation of California Application February 8, 1944, Serial No. 521,749

9 Claims. (Cl. 251—91)

This invention relates to apparatus peculiar to the great oil field industry and is a valve of the type there known as a "kelly cock."

One of the several objects of this invention is to provide a kelly cock of extremely simple and low cost manner of construction, and of reliable mode of operation due to the small number of its relatively movable parts going into the construction of the valve shutter assembly; it being particularly an object to provide a single-block type carrier provided with a simple closure or shutter. Further, it is an object of the invention to provide an improved manner and means for mounting and operatively supporting the movable shutter carrier in the casing or valve body, and for the ready application and removal of the carrier and shutter assembly to and from the casing as required from time to time, and particularly to provide for the safe and direct application of a complementary tool for actuation of the valve carrier.

Also, it is an object of the invention to make an advance in the structural assembly of distinctly bulbous body valves examples of which may be seen in the very early Patent 144,942, issued to J. N. Allen, November 25, 1873, and in a later, oil industry patent, Lyne, 1,502,106, of July 22, 1924, which show rotary valve closures having operating stems or devices substantially encompassed in the bulbous body so that the exterior surface of the assembly is free of projections. Particularly, it is an object to provide a valve or kelly cock in which there is a main rotary body on an axis transverse to the flow axis of the valve and which has an integral actuating stem device exposed directly to the exterior at one side of the casing for tool application and which stem is journalled in a thrust bushing which is mounted bodily within the relative side of the casing and which turning stem is coaxial with a short trunnion on the opposite end of the rotary body or carrier having bearing in a blind opposite wall of the casing.

The invention consists in certain advancements in this art as set forth in the ensuing disclosure and having, with the above, additional objects and advantages as hereinafter developed, and whose constructions, combinations, and details of means, and the manner of operation will be made manifest in the following description of the herewith illustrative embodiment; it being understood that modifications, variations, and adaptations may be resorted to within the spirit, scope and principle of the invention as it is more particularly claimed in the addendum.

Figure 1 is a side elevation of the valve, to show position stop means.

Figure 2 is an axial section of the valve.

This valve or kelly cock includes a substantial, bulbous casing 2 having an axial longitudinal flow duct 3 ending in coaxial nipple and box parts 4 and 5, respectively, to threadedly connect to a kelly bar and other stem fittings not here shown. Transversely intersecting with the duct 3 is a large cylindrical bore 6 whose axis is radial to the axis of the casing duct. At one end of the chamber or bore 6 is a substantially blind wall 7 of the casing 2, and in which wall is fitted a small grease injection fitting 8.

The wall 7 has, on the axis of the bore 6, a journal bore 9 for reception and support of a complementary trunnion 10 provided on the adjacent end of a cylindrical, one-piece block or rotary valve member herein called the carrier 11 and which has a loose, turning fit in its complementary reception bore 6 of the casing. This carrier 11 has a diametrical flow hole 12 of about the same diameter as and to turn into axial register with the duct 3.

Countersunk in one side of the carrier 11 is a discal shutter 13 with an outer cylindrical bearing face 14 complementary to the bore 6 and of a diameter to very fully cover the outlet or upper end of the casing duct 3 (leading into the box 5). This shutter 13 constantly thrusts outwardly in the carrier, to make a sealing contact on the face of the bore 6, by a stout expansion spring 15 compressed between the shutter and an engaged face of the carrier. Seating pressure of the shutter 13 may sometimes be boosted by fluid pressure in the hook-up or stem assembly by flow of fluid through small ports 16 and 17 in the carrier member, and leading to the flow hole 12 thereof and from it to back of the shutter 13, when this is in the illustrated, valve closing position.

A feature of this invention is the provision of means having the triple functions of journalling the end of the carrier which is opposite from the trunnion 10, of pressing it endwise in the casing bore to a seat on the blind wall 7, and of directly exposing a part of the carrier for application of a turning tool (not shown), and which means additionally provides a device for open-and-closed position stops of the rotary valve carrier.

This multiple-function means here includes a relatively large discoidal bushing 20, in the form of a removable cheek, having peripheral threads 21 screwing into a side pocket 22, having wall threads 23 matching the bushing threads 21, provided coaxially in the relative side of the casing 2. Rotatively mounted in the bushing 20 is the coaxial and large stem 24 of the near end of the carrier member 11 whose near end presents a wide, annular shoulder 25 on which is seated a flat washer 26 engaged by the inner end of the bushing 20 whereby the unitary carrier 11 is pushed axially toward the blind wall 7 of the casing to bear on an end thrust packing ring 27 resting on wall face 28 at the end of the casing bore 6. The extended carrier stem 24 is sealed off therein by suitable hydraulic packing 24' in the bore of the stem supporting bushing 20.

After the carrier and the bushing parts have been installed in the casing spaces provided therefor the bushing may be locked in any suitable manner against unintentional movement in the casing as by a simple set screw 29 interlocking it with the casing 2.

To effect easy rotation of the valve insides 11—13 the outer end of the stem 24, exposed in the countersunk bushing 20, here has an end, wrench-taking socket 24a. It will thus be seen that the carrier 11 has reduced end parts 10 and 24 constituting stub or short shafts bearing in end journals afforded by the side wall 7 and the countersunk bearing and thrust bushing 20.

Clear view, valve position means is provided whereby to stop the valve carrier 11 in full open or in full closed position of its countersunk shutter 13, and here includes a crown ring 30 countersunk in the outer end of the bushing 20 and lying adjacent to an outer wall surface 31 of the bushing and which is substantially flush with the outer end of the integral, valve carrier stem 24. This crown ring 30 thus overhangs the bushing 20 and is rigidly fixed to the stem 24 as by means of cap screws 32 engaged in the end of the stem 24. The rim of the crown ring 30 is provided with about a quarter-circle notch 33 into which projects a narrow nog 34 of the outer end of the bushing 20, which, as above stated is fixed in the wall of the casing 2. Therefore, the valve insides can only be turned from the closed position (shown) to open position, or vice versa, and this is clearly indicated by fully exposed, clear-view legends "Open" and "Closed," here provided on the crown 30.

To make a stream-line valve structure none of the insert valve parts project outwardly of the globular exterior of the casing, but in view of Allen (supra) this feature is not broadly claimed, but the Allen patent does not show the herein disclosed insert assembly.

What is claimed is:

1. A kelly cock having a casing with a crossbore, a valve closure device arranged in said bore and having bearing trunnions at each end, and casing side wall parts having journals to rotatively support the said trunnions; one of said wall parts consisting of a bushing removably screwed in the side of the casing and constituting one of the journals and the valve trunnion mounted therein being in the form of an elongate stem the outer end of which presents a turning tool receiver, and a ring attaching the stem to the bushing.

2. A kelly cock having a stream lined casing, a valve insides turnably journalled in, and on an axis across, the casing, and a bushing having peripheral threads screwing into one side of the casing and telescoping over and journaling one end of the valve insides; said bushing operative by its screw action to press the valve insides axially to an end seat therefor in the casing and an insides extracting ring fixed to the bushing end of the insides and turnably interlocking with the bushing.

3. A kelly cock having a casing, a removable bushing bodily countersunk in one side of the casing, a valve closing device rotatively mounted coaxial with the bushing in transverse position as to and in the casing, and means connecting the closing device to the bushing for concurrent removal therewith.

4. A kelly cock having a casing, a rotary valve closing device operatively disposed in the casing, and a threaded bushing screwed in the casing to close in and journalling one end of the said device, and a retracting ring fixed on said device and forming a connection between the bushing and the device providing for their relative rotation and limitation against relative end shift.

5. A kelly cock having a casing, a rotary closure device disposed in the casing, a cover means removably fixed to one side of the casing, and having a connection to said device to provide for its rotation and for extracting the closure with and by the cover means.

6. A kelly cock having a casing with a transverse bore opening at one side of the casing, a removable cheek member on the casing to close the open end of the bore, a valve closure disposed in the casing, and a connection between the closure and said member to effect removal of the closure with the said member and providing for ready rotation of the closure; said connection including a ring outwardly flush with the said member.

7. In a cock valve, an insides unit including, in combination, an external cheek member applicable to a casing to close a bore thereof, a valve closure device for operation in said bore, and means connecting said member and said device for relative rotation and holding them in assembled relation as a unit for bodily application to and removal from the casing.

8. The combination of claim 7; said means including a feature to stop relative rotation of the said member and said device at predetermined points.

9. A kelly cock having a casing, a rotary closure device fitted in the casing, a side cheek bushing member fitting in the casing, a part forming a cover over and rigidly secured to said device and rotatively interengaging the said member without end play, and a means for fixing the said member in the casing.

JOSEPH R. GREENLEE.

REFERENCES CITED

The following references are of record in the file of this patent:

UNITED STATES PATENTS

| Number | Name | Date |
| --- | --- | --- |
| 1,502,106 | Lyne | July 22, 1924 |
| 144,942 | Allen | Nov. 25, 1873 |
| 2,329,981 | Church | Sept. 21, 1943 |
| 2,035,818 | MacClatchie | Mar. 31, 1936 |
| 1,309,732 | Hawley | July 15, 1919 |
| 1,322,197 | Molinary | Nov. 18, 1919 |
| 1,569,285 | Katona | Jan. 12, 1926 |